US012607210B2

(12) United States Patent
Zhuang

(10) Patent No.: US 12,607,210 B2
(45) Date of Patent: Apr. 21, 2026

(54) ADJUSTABLE POT LID HOLDER

(71) Applicant: Xiaoyuan Zhuang, Shenzhen (CN)

(72) Inventor: Xiaoyuan Zhuang, Shenzhen (CN)

( * ) Notice: Subject to any disclaimer, the term of this patent is extended or adjusted under 35 U.S.C. 154(b) by 77 days.

(21) Appl. No.: 18/387,865

(22) Filed: Nov. 8, 2023

(65) Prior Publication Data

US 2025/0137477 A1 May 1, 2025

(30) Foreign Application Priority Data

Oct. 25, 2023 (CN) .......................... 202322882150.7

(51) Int. Cl.
*F16B 2/12* (2006.01)
*A47J 47/16* (2006.01)

(52) U.S. Cl.
CPC .................. *F16B 2/12* (2013.01); *A47J 47/16* (2013.01)

(58) Field of Classification Search
CPC ...... F16B 2/00; F16B 2/02; F16B 2/04; F16B 2/206; F16B 2/12; A47J 47/16
USPC ............ 248/229.12, 229.14, 229.15, 229.22, 248/229.24, 229.25, 228.3, 228.5, 228.6, 248/231.41, 231.61, 231.71, 316.4, 316.6
See application file for complete search history.

(56) References Cited

U.S. PATENT DOCUMENTS 4,364,537 A * 12/1982 Helzer .................. A47G 1/1646
248/448
4,473,207 A * 9/1984 Nascher ............... A47G 1/1646
248/490

| | | | | |
|---|---|---|---|---|
| 6,299,118 B1 * | 10/2001 | Farrell | .................... | A01G 9/024 |
| | | | | 248/323 |
| 2004/0250687 A1 * | 12/2004 | Schultz | ............... | A47J 27/0813 |
| | | | | 99/337 |
| 2007/0001088 A1 * | 1/2007 | Bowman | ................ | A47G 7/047 |
| | | | | 248/690 |
| 2007/0205346 A1 * | 9/2007 | Jackson | ............. | A47G 25/0614 |
| | | | | 248/307 |
| 2013/0019759 A1 * | 1/2013 | Tumenbatur | ........ | A47J 27/0813 |
| | | | | 126/374.1 |
| 2013/0249226 A1 * | 9/2013 | Marshall | ................. | A47J 45/10 |
| | | | | 294/34 |
| 2015/0157885 A1 * | 6/2015 | Liu | .......................... | E04G 21/32 |
| | | | | 182/3 |
| 2015/0322983 A1 * | 11/2015 | Eisenkolb | ................. | E06B 9/24 |
| | | | | 16/87.2 |
| 2019/0390692 A1 * | 12/2019 | Li | ......................... | F16M 11/041 |

(Continued)

*Primary Examiner* — Alfred J Wujciak
(74) *Attorney, Agent, or Firm* — Olive Law Group, PLLC

(57) ABSTRACT

An adjustable pot lid holder comprises a holder base, a first supporting frame, a second supporting frame and a regulating structure. The holder base is fastened to external items by a fixing structure; the first supporting frame is arranged integrally on the holder base; the second supporting frame is moveable assembled on the holder base, used to bear pot lids with the cooperation of the first supporting frame; one part of the regulating structure is arranged on the second supporting frame and the other is arranged on the holder base, used to adjust the distance which gradually decreases from top to bottom between the second supporting frame and the first supporting frame. Adjusting the clamping distance between the first supporting frame and the second supporting frame to clamp the pot lid by the regulating structure, the effect of pot lid holders fitted with pot lids in various sizes is achieved.

8 Claims, 4 Drawing Sheets

(56)                     References Cited

U.S. PATENT DOCUMENTS

2020/0305650 A1 * 10/2020 Biscardi ................. A47J 47/16
2023/0184373 A1 * 6/2023 Hurtado ................. B60R 13/08

* cited by examiner

ADJUSTABLE POT LID HOLDER

FIELD OF THE INVENTION

The present patent relates to the technical field of kitchen aid holder, in particular to an adjustable pot lid holder.

BACKGROUND OF THE INVENTION

The pot lids are usually round, with a handle in the middle. In ancient, pot lids were mostly made of wood, some were metal, and aluminum was the most common. In Yunnan, there were also pot lids made of grass that resembled straw hats. The main function of the pot lid is to maintain the temperature of the goods in the pot and prevent the goods in the pot from splashing and steam escaping due to heating and other factors. Now, the pot lids are mostly made of glass and metal, wherein aluminium and stainless steel are common. When use the pots, it is needed to remove and cover the lid many times to ensure the cooking of food. Current using of pot lids, when take off and put the pot lid directly on the countertop, it is easily contaminated and affects the health of users. Therefore, there are some pot lid holders placed on the countertop or hung on the wall, such as a pot lid placing rack (U.S. Pat. No. 5,660,284A) shows that, pot lid holders placed on countertop usually occupy a large space on the cabinet or stove, which is not beneficial to the rational use of the countertop and is very inconvenient. The wall-mounted pot lid holder is usually integrated which cannot be adapted to the pot lid sizes of users. Therefore, those technicians in the art would like to design an adjustable pot lid holder to accommodate the placement of pot lids in different sizes.

DETAILED DESCRIPTION

Aiming at the defects and deficiencies of the prior art, the present patent provides an adjustable pot lid holder. As adopting above technical solution, users could adjust the clamping distance between the first supporting frame and the second supporting frame to clamp the pot lid by the regulating structure, which achieves the effect of pot lid holders fitted with pot lids in various sizes.

To achieve the above purpose, the present patent adopts the following technical solutions: an adjustable pot lid holder, comprises a holder base, which is fastened to external items by a fixing structure; a first supporting frame, which is arranged integrally on the holder base; a second supporting frame, which is moveable assembled on the holder base and used to bear pot lids with the cooperation of the first supporting frame; and a regulating structure, whose one part is arranged on the second supporting frame and the other is arranged on the holder base, used to adjust the distance between the second supporting frame and the first supporting frame.

Optionally, the first supporting frame and the second supporting frame constitutes a U-shaped structure with opposite openings; the distance gradually decreases from top to bottom between the second supporting frame and the first supporting frame.

Optionally, the regulating structure comprises a sliding piece which is a sliding groove arranged on the holder base; a guiding groove is arranged on the holder base to connect with the sliding groove; a slideable board is slidably assembled in the sliding groove and a connector block is slidably arranged in the guiding groove, whose two sides are fixed connected with the second supporting frame and the slideable board separately.

Optionally, the connector block is capable of rotating horizontally relative to the holder base; several hooked grooves are arranged on the upper inner side wall and/or the inferior inner side wall of the sliding groove on the holder base at intervals; the upper and/or lower side of the slideable board is provided with at least one insertion block that capable of being plugged into or separating from the hooked groove; when the insertion block plugs into the inserting groove, the first supporting frame parallels to the upper surface of the second supporting frame or both on the same plane; when the insertion block separates from the hooked groove, the first supporting frame and the plane where the upper surface of the second supporting frame are arranged at an angle, and the slideable board is capable of moving in the sliding groove.

Optionally, the sliding groove is wider than the guiding groove; the slideable board is wider than the guiding groove; an opening is arranged on the one side of the holder base away from the first supporting frame to connect with the guiding groove.

Optionally, limited bumps are arranged on the upper and lower sides of the guiding groove, near to the one end of the openings; the distance of the limited bumps between the upper and lower sides of the guiding groove is shorter than the diameter of the connector block.

Optionally, one insertion block, which is arranged on the upper surface of the slideable board and close to one end of the first supporting frame; the insertion block and the hooked groove are triangular.

Optionally, several insertion blocks, which are arranged on the lower surface of the slideable board at intervals; the insertion block and the hooked groove are in a trapezoid shape.

Optionally, the regulating structure is provided with a hooked pieces arranged on the holder base which are several inserting grooves arranged on the holder base at intervals; at least one insertion piece fixed is arranged on the second supporting frame and plugged into the inserting groove.

Optionally, the inserting groove extends downward from the upper surface of the holder base; a guideway is arranged on the front surface of the holder base to connect with the inserting groove; the inserting groove is wider than the guideway; the connector block is plugged into the guideway and arranged between the insertion piece and the second supporting frame.

Optionally, the combination of the connector block and the insertion piece is in a Ⱶ or T shape.

Optionally, the holder base is provided with a fixing groove; the fixing structure is an adhesive layer arranged in the fixing groove.

Optionally, the holder base is provided with several fixing holes at intervals; the fixing structure is a bolt which is capable of passing through the fixing hole and fastening to external items.

Optionally, the first supporting frame and the second supporting frame both comprise a connecting piece, a pot lid supporting piece and an outer protecting piece; the pot lid supporting piece is curved, whose two sides are connected with the connecting piece and the outer protecting piece separately; the connecting piece, the pot lid supporting piece and the outer protecting piece are enclosed in a U-shaped structure.

Optionally, the first supporting frame is arranged integrally on the front surface of one end of the holder base; a storage slot extending from top to bottom, is arranged on the holder base close to one end of the first supporting frame.

After adopting the above technical solution, the beneficial effects of the present patent are: an adjustable pot lid holder, comprises a holder base, a first supporting frame, a second supporting frame and a regulating structure. The holder base is plate-shaped and fastened to external items by a fixing structure; the first supporting frame is arranged integrally on the holder base; the second supporting frame is moveable assembled on the holder base and used to bear pot lids with the cooperation of the first supporting frame; one part of the regulating structure is arranged on the second supporting frame and the other is arranged on the holder base, used to adjust the distance between the second supporting frame and the first supporting frame. In this embodiment, the first supporting frame and the second supporting frame constitutes a U-shaped structure with opposite openings; the distance gradually decreases from top to bottom between the second supporting frame and the first supporting frame. It should be noted that as users could adjust the clamping space between the first supporting frame and the second supporting frame to clamp the pot lid by the regulating structure, which achieves the effect of adjusting the distance between two supporting frames according to pot lids in various sizes to achieve the goal of the pot lid holders fitted with pot lids in different sizes.

DESCRIPTION OF THE DRAWINGS

In order to explain the embodiments of the present patent or the technical solution in the prior art more clearly, the drawings needed to be used in the description of the embodiments or the prior art will be briefly introduced below. Obviously, the drawings in the following description are only some embodiments of the present patent. For those ordinary technicians in the art, other drawings can be obtained based on these drawings without exerting creative efforts.

Figure 1:
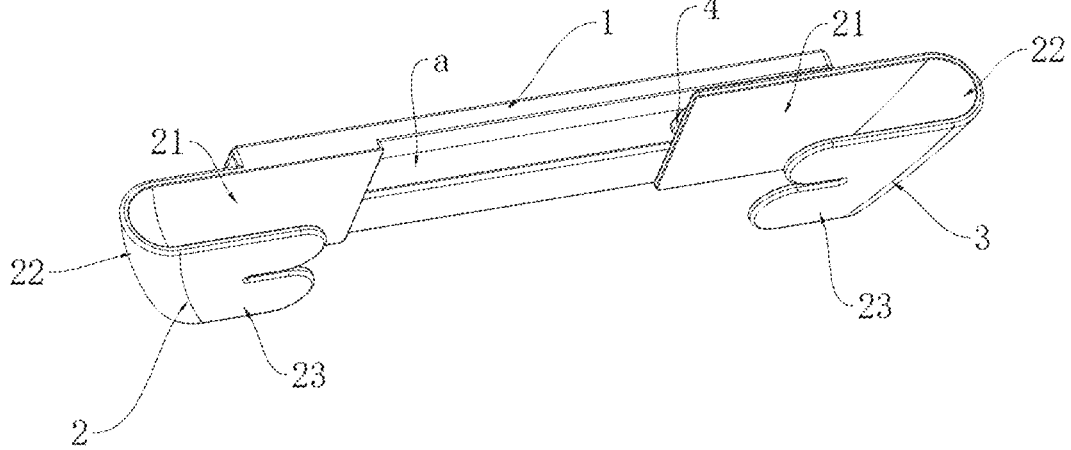
FIG. 1 is a structural diagram of the present patent.

Explanation of reference symbols: 1. holder base; 2. first supporting frame; 3. second supporting frame; 4. regulating structure; a. sliding groove; 41. slideable board; 42. connector block; b. guiding groove; 21. connecting piece; 22. pot lid supporting piece; 23. outer protecting piece; c. hooked groove; 411. insertion block; 11. limited bump; 43. insertion piece; d. inserting groove; e. guideway; 5. adhesive layer; f. storage slot; g. fixing groove.

DETAILED DESCRIPTION OF THE PREFERRED EMBODIMENTS

The present patent will be further described in detail below in conjunction with the drawings and specific embodiments:

This specific embodiment is only an explanation of the present patent, instead of a limitation. Those technicians in the art can make modifications to this embodiment without creative contribution as needed after reading this specification, as long as they are in claims of the present patent, all protected by patent law.

It should be noted that when an element is referred to as being fixed or arranged on another element, it can be directly or indirectly on the another element. When an element is referred to as being connected to another element, it can be directly or indirectly connected to the another element.

It should be understood that the terms "length" "width" "upper" "lower" "front" "back" "left" "right" vertical" "horizontal" "top" "bottom" "inner" "outer", etc., are based on the orientations or positional relationships shown in the drawings. They are only for the convenience of describing the present patent and simplifying the description, rather than indicating or implying the device referred to or element must have a specific orientation and orientation to be constructed and operated. Therefore, they are not to be considered to be limitations on the patent.

Moreover, the terms "first" "second" are only for describing aims, rather than indicating or implying relative importance or implicitly specify the number of indicated technical characteristics. Therefore, features defined as "first" and "second" explicitly or implicitly include one or more of these features. In the description of some patents, "several" means two or more, unless otherwise specific limitations.

This embodiment relates to an adjustable pot lid holder, as FIG. 1-6 shows, which comprises a holder base 1, a first supporting frame 2, a second supporting frame 3 and a regulating structure 4.

The holder base is plate-shaped and fastened to external items by a fixing structure. The first supporting frame 2 is arranged integrally on the holder base 1, they are one piece or fixed by welding or injection molding. The second supporting frame 3 is moveable assembled on the holder base 1 and used to bear pot lids with the cooperation of the first supporting frame 2; one part of the regulating structure 4 is arranged on the second supporting frame 3 and the other is arranged on the holder base 1, used to adjust the distance between the second supporting frame 3 and the first supporting frame 2. In this embodiment, the first supporting frame 2 and the second supporting frame 3 constitutes a U-shaped structure with opposite openings; the adjustable pot lid holder is made of metal or hard plastic. In this embodiment, the first supporting frame 2 and the second supporting frame 3 both comprise a connecting piece 21, a pot lid supporting piece 22 and an outer protecting piece 23. The pot lid supporting piece 22 is curved, whose two sides are connected to the outer protecting piece 23 separately; the connecting piece 21, the pot lid supporting piece 22 and the outer protecting piece 23 are enclosed in a U-shaped structure. The outer protecting piece 23 is M-shaped or rectangular. The connecting piece 21, the pot lid supporting piece 22 and outer protecting piece 23 are one piece; the connecting piece 21 of the first supporting piece 2 and the holder base 1 are one piece or fixed by welding or injection molding. In other embodiments, the first supporting frame 2 and the second supporting frame 3 constitutes a V-shaped or Ⅱ-shaped structure with opposite openings. Optionally, the distance decreases gradually from top to bottom between the second supporting frame 3 and the first supporting frame 2 for the supporting frame to clamp the pot lid stably. Optionally, a supporting rib or supporting plate is arranged in the bottom of the clamping space enclosed by the first supporting frame 2 and the second supporting frame 3.

It should be noted that as users could adjust the clamping space between the first supporting frame 2 and the second supporting frame 3 to clamp the pot lid by the regulating structure 4, which achieves the effect of adjusting the distance between two supporting frames according to pot lids in various sizes to achieve the goal of the pot lid holders fitted with pot lids in different sizes.

Figure 2:
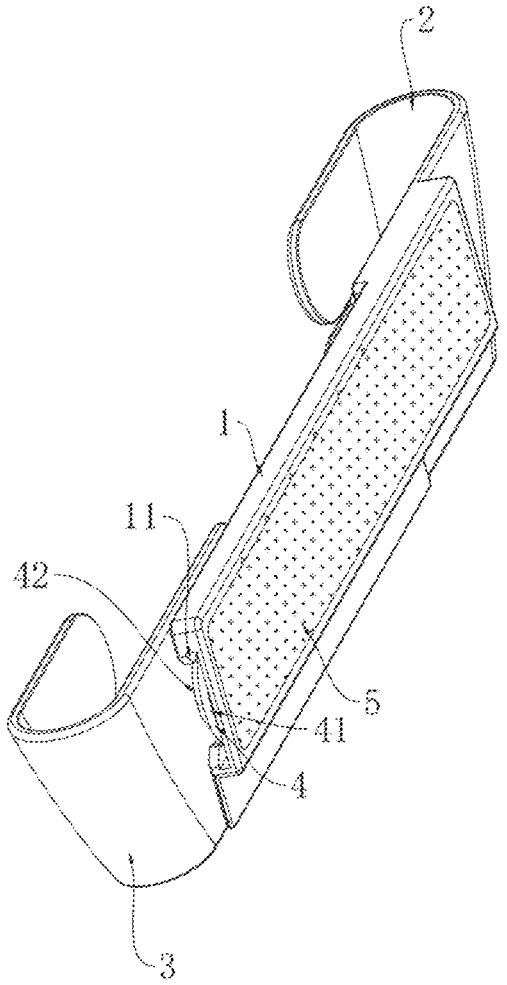
FIG. 2 is a structural diagram of the present patent in another direction.
Figure 3:
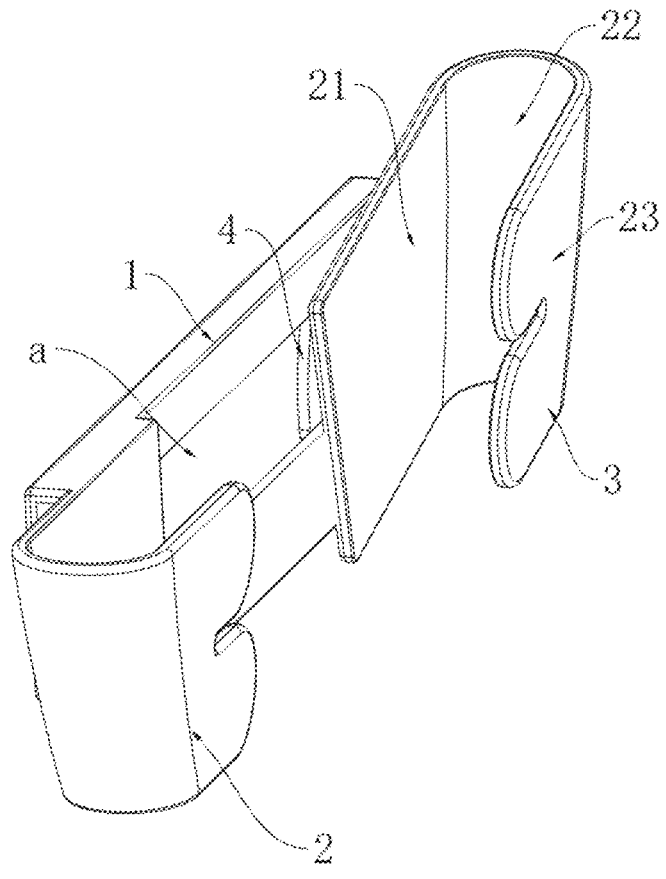
FIG. 3 is a structural diagram of the insertion block and the hooked groove are in separation condition on the slidable board.
Figure 4:
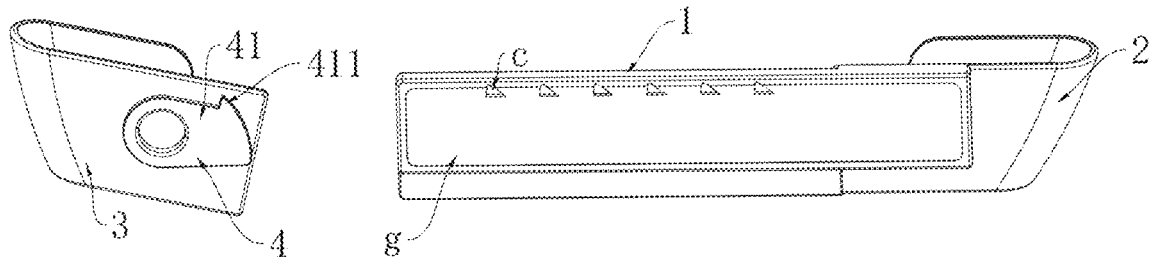
FIG. 4 is an explosion diagram of removing the adhesive layer in the present patent.
Figure 5:
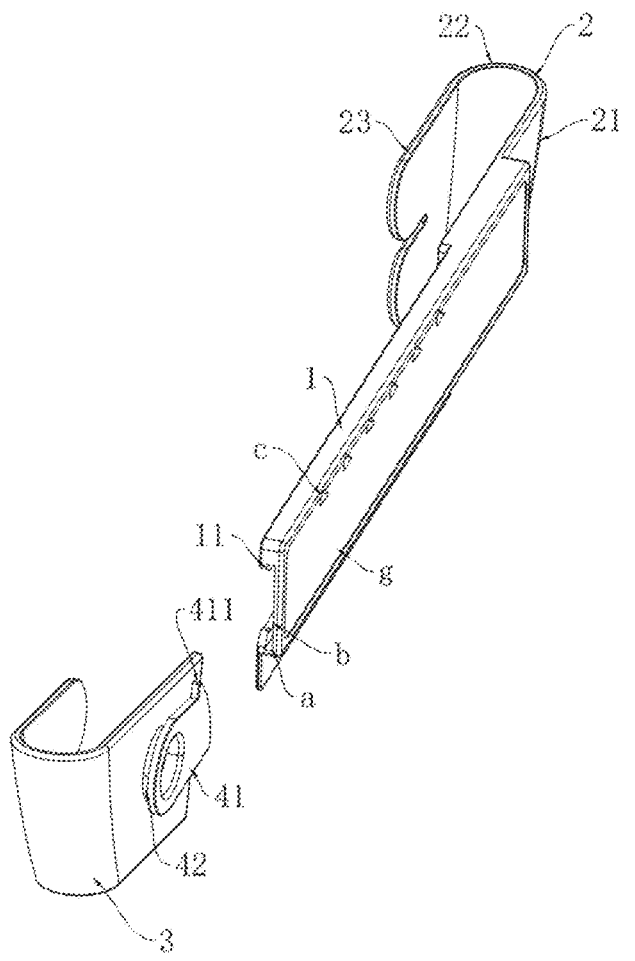
FIG. 5 is an explosion diagram of the present patent in another direction.
Figure 6:
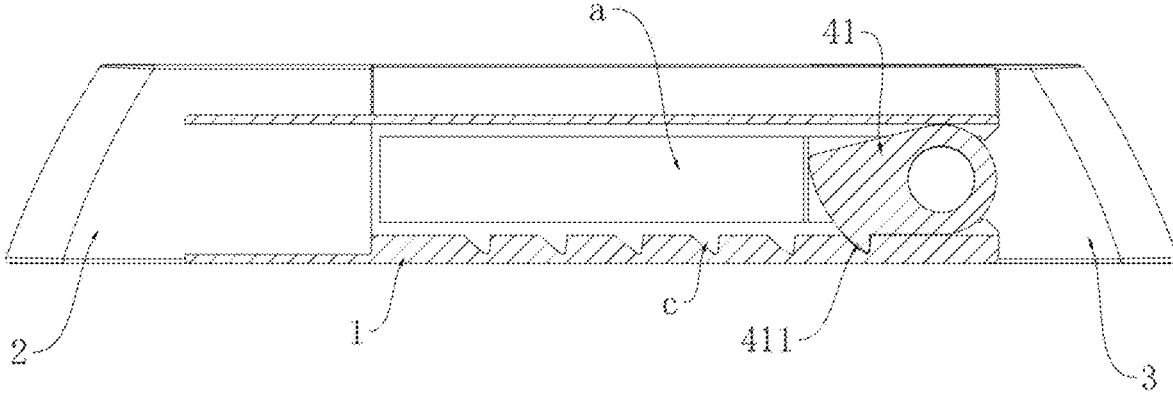
FIG. 6 is a sectional view of the present patent.

In one of the embodiments, in order to adjust the clamping space between the first support frame 2 and the second support frame 3 to accommodate pot lids in different sizes while preventing the pot lids from loosening during the clamping process, as FIG. 2-6 shows, the regulating structure 4 comprises a sliding piece, a slideable board 41 and a connector block 42. The sliding piece is a sliding groove a arranged vertically on the holder base 1; the holder base 1 is provided with a guiding groove b connected with the sliding groove a; the slideable board 41 is slidably assembled in the sliding groove a. The connector block 42 is slidably arranged in the guiding groove b and two sides are fixed connected with the second supporting frame 3 and the slideable board 41 separately. The connecting piece 21 of the second supporting frame 3 and the connector block 42 are one piece or fixed by welding or injection molding. The connector block 42 fix the slideable board 41 and the second supporting frame 3 which achieves the goal of moving the second supporting frame 3 along the extension direction of the sliding groove a, and the second supporting frame 3 driving the slideable board 41 to move along the sliding groove a by the connector block 42, which is convenient for users to adjust the clamping space between the two supporting frames according to pot lids in different sizes. As FIG. 4-6 shows, in this embodiment, the connector block 42 is capable of rotating horizontally relative to the holder base 1, several hooked grooves c are arranged on the upper inner side wall and/or the lower inner side wall of the sliding groove a on the holder base 1 at intervals; the upper and/or lower side of the slideable board 41 is provided with at least one insertion block 411 which capable of being plugged into or separating from the hooked groove c. The insertion block 411 is arranged on the slideable board 41 to plug into the inner side wall of the sliding groove a to lock the second supporting frame 3, which prevents from the pot lid falling off caused by the effect of own gravity when users adjust the space between the two clamping frames. When the insertion block 411 plugs into the inserting groove c, the first supporting frame 2 parallels to the upper surface of the second supporting frame 3 or both are on the same plane; when the insertion block 411 separates from the hooked groove c, the first supporting frame 2 and the plane where the upper surface of the second supporting frame 3 are arranged at an angle, and the slideable board 41 is capable of moving in the sliding groove a.

It should be noted that, as FIGS. 1 and 3 shows, when needed to adjust the clamping space in the pot lid holder, it is first to turn the second supporting frame 3 to drive the slideable board 41 to rotate horizontally in the sliding groove a until the insertion block 411 separates from the hooked groove c totally, meantime the first supporting frame 2 and the plane where the upper surface of the second supporting frame 3 are arranged at an angle, then move the second supporting frame 3 along the sliding groove a to needed location, turn the second supporting frame 3 in opposite direction to make the insertion block 411 on the slideable board 41 plugged into another hooked groove c. When the first supporting frame 2 parallels to the upper surface of the second supporting frame 3 or both are on the same plane, the effect of adjustment of clamping space in the pot lid holder is achieved, which is easy to operate and convenient for users to adjust the clamping space in the pot lid holder according to pot lids in different sizes.

Moreover, to make the holder base 1 support the second supporting frame 3 stably, as FIG. 5 shows, the sliding groove a is wider than the guiding groove b; the slideable board 41 is wider than the guiding groove b; an opening is arranged on the one side of the holder base 1 away from the first supporting frame 2 to connect with the sliding groove a and the guiding groove b.

Moreover, to reduce the possibility of the second supporting frame 3 separating from the holder base 1, as FIG. 5 shows, limited bumps 11 are arranged on the upper and lower sides of the guiding groove b, which are close to the one end of the openings; the distance of the limited bumps 11 between the upper and lower sides of the guiding groove b is shorter than the diameter of the connector block 42. In this embodiment, the connector block 42 is round.

In one of the embodiments, the regulating structure 4 is provided with hooked pieces and a insertion piece 3. The hooked pieces are arranged on one surface of the holder base 1 which are several inserting grooves d arranged on the holder base 1 at intervals. And at least one insertion piece 43 fixed arranged on the second supporting frame 3 and plugged into the inserting groove d. Moreover, the inserting groove d extends downward from the upper surface of the holder base 1; a guideway e is arranged on the front surface of the holder base 1 and connected with the inserting groove d; the inserting groove d is wider than the guideway e; the connector block 42 is plugged into the guideway e and arranged between the insertion piece 43 and the second supporting frame 3. Optionally, the combination of the connector block 42 and the insertion piece 43 is in a ⊥ or T shape.

It should be noted that, when needed to adjust the clamping space in the pot lid holder, pull out the second supporting frame 3 from bottom to top firstly to drive to separate the insertion piece 43 and the sliding groove a, the connector block 42 and the guiding groove e; then plug the insertion piece 43 from top to bottom into the suitable inserting groove d to make it connect with and plug into the guiding groove e, the effect of adjustment of clamping space in the pot lid holder is achieved, which is easy to operate and convenient for users to adjust the clamping space in the pot lid holder according to pot lids in different sizes.

Based on above embodiments, in some embodiments, as FIGS. 2 and 4 shows, to make the pot lid holder fastened to external items, such as wall, the back surface of the holder base 1 is provided with a fixing groove; the fixing structure is an adhesive layer 5 arranged in the fixing groove. In some embodiments, the holder base 1 is provided with several fixing holes at intervals; the fixing structure is a bolt which is capable of passing through the fixing hole and fastening to external items.

All above is only an explanation of the present patent, instead of a limitation. Those technicians in the art make other modifications or equivalent replacement to this embodiment, as long as they do not deviate from the spirit and scope of the technical solutions of the present patent, all should be covered by the claims of the present patent.

The invention claimed is:

1. An adjustable pot lid holder, characterized in comprising a holder base, which is capable of fastening to external items by a fixing structure; a first supporting frame, which is arranged integrally on the holder base; a second supporting frame, which is moveable assembled on the holder base, used to bear pot lids with the cooperation of the first supporting frame; and a regulating structure, whose one part is arranged on the second supporting frame and the another part is arranged on the holder base, used to adjust the distance between the second supporting frame and the first supporting frame; the regulating structure comprises a sliding piece which is a sliding groove arranged on the holder base; a guiding groove is arranged on the holder base to connect with the sliding groove; a slideable board is slidably assembled in the sliding groove; a connector block is slidably arranged in the guiding groove; two sides of the connector block are fixed connected with the second supporting frame and the slideable board.

2. The adjustable pot lid holder according to claim 1, characterized in that the first supporting frame and the second supporting frame constitutes a U-shaped structure with opposite openings; the distance gradually decreases from top to bottom between the second supporting frame and the first supporting frame.

3. The adjustable pot lid holder according to claim 2, characterized in that the regulating structure is provided with hooked pieces arranged on one surface of the holder base which are several inserting groove arranged on the holder base at intervals; a insertion piece is fixed arranged on the second supporting frame, which capable of plugging into the inserting groove.

4. The adjustable pot lid holder according to claim 1, characterized in that the connector block is capable of rotating horizontally relative to the holder base; several hooked grooves are arranged on the upper inner side wall and/or the inferior inner side wall of the sliding groove on the holder base at intervals; the upper and/or lower side of the slideable board is provided with at least one insertion block that can be plugged into or separated from the hooked groove; when the insertion block plugs into the inserting groove, the first supporting frame parallels to the upper surface of the second supporting frame or both are on the same plane; when the insertion block separates from the hooked groove, the first supporting frame and the plane where the upper surface of the second supporting frame are arranged at an angle, and the slideable board is capable of moving in the sliding groove.

5. The adjustable pot lid holder according to claim 4, characterized in that the sliding groove is wider than the guiding groove; the slideable board is wider than the guiding groove; an opening is arranged on the one side of the holder base away from the first supporting frame to connect with the guiding groove.

6. The adjustable pot lid holder according to claim 5, characterized in that limited bumps are arranged on the upper and lower sides of the guiding groove, near to the one end of the openings; the distance of the limited bump between the upper and lower sides of the guiding groove is shorter than the diameter of the connector block.

7. The adjustable pot lid holder according to claim 1, characterized in that the back surface of the holder base is provided with a fixing groove; the fixing structure is an adhesive layer arranged in the fixing groove.

8. The adjustable pot lid holder according to claim 1, characterized in that the first supporting frame and the second supporting frame both comprise a connecting piece, a pot lid supporting piece and an outer protecting piece; the pot lid supporting piece is curved, whose two sides are connected with the connecting piece and the outer protecting piece separately; the connecting piece, the pot lid supporting piece and the outer protecting piece are enclosed in a U-shaped structure.

\* \* \* \* \*